US012387411B2

(12) United States Patent
Hefny et al.

(10) Patent No.: US 12,387,411 B2
(45) Date of Patent: Aug. 12, 2025

(54) PUPPETEERING A REMOTE AVATAR BY FACIAL EXPRESSIONS

(71) Applicant: Google LLC, Mountain View, CA (US)

(72) Inventors: Tarek Hefny, Redmond, WA (US); Nicholas Reiter, Mountain View, CA (US); Brandon Young, Mountain View, CA (US); Arun Kandoor, Santa Clara, CA (US); Dillon Cower, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/391,767

(22) Filed: Dec. 21, 2023

(65) Prior Publication Data

US 2024/0127523 A1 Apr. 18, 2024

Related U.S. Application Data

(63) Continuation of application No. 18/058,621, filed on Nov. 23, 2022, now Pat. No. 11,887,235, which is a
(Continued)

(51) Int. Cl.
*G06T 13/40* (2011.01)
*G06T 7/13* (2017.01)
(Continued)

(52) U.S. Cl.
CPC ............... *G06T 13/40* (2013.01); *G06T 7/13* (2017.01); *G06T 7/73* (2017.01); *G06T 17/20* (2013.01);
(Continued)

(58) Field of Classification Search
CPC .......... G06T 19/20; G06T 17/20; G06T 13/40
See application file for complete search history.

(56) References Cited

U.S. PATENT DOCUMENTS

| 2013/0201187 A1 | 8/2013 | Tong et al. |
| 2015/0042743 A1 | 2/2015 | Cullen |

(Continued)

FOREIGN PATENT DOCUMENTS

| JP | 2011210118 A | 10/2011 |
| WO | 2013020248 A1 | 2/2013 |

OTHER PUBLICATIONS

International Search Report for the related Application No. PCT/US2019/030218 dated May 1, 2019, 16 pages.
(Continued)

*Primary Examiner* — Matthew Salvucci
(74) *Attorney, Agent, or Firm* — Honigman LLP; Brett A. Krueger

(57) ABSTRACT

A method includes receiving a first facial framework and a first captured image of a face. The first facial framework corresponds to the face at a first frame and includes a first facial mesh of facial information. The method also includes projecting the first captured image onto the first facial framework and determining a facial texture corresponding to the face based on the projected first captured image. The method also includes receiving a second facial framework at a second frame that includes a second facial mesh of facial information and updating the facial texture based on the received second facial framework. The method also includes displaying the updated facial texture as a three-dimensional avatar. The three-dimensional avatar corresponds to a virtual representation of the face.

20 Claims, 9 Drawing Sheets

Related U.S. Application Data continuation of application No. 17/052,161, filed as application No. PCT/US2019/030218 on May 1, 2019, now Pat. No. 11,538,211.

(60) Provisional application No. 62/667,767, filed on May 7, 2018.

(51) Int. Cl.
  *G06T 7/73* (2017.01)
  *G06T 17/20* (2006.01)
  *G06T 19/20* (2011.01)
  *H04L 67/10* (2022.01)

(52) U.S. Cl.
  CPC .... *G06T 19/20* (2013.01); *G06T 2207/10024* (2013.01); *G06T 2207/30201* (2013.01); *H04L 67/10* (2013.01)

(56) References Cited

U.S. PATENT DOCUMENTS

| | | |
|---|---|---|
| 2015/0084950 A1 | 3/2015 | Li et al. |
| 2016/0127641 A1 | 5/2016 | Gove |
| 2017/0039750 A1 | 2/2017 | Tong et al. |
| 2017/0132828 A1* | 5/2017 | Zelenin ............... A63F 13/63 |
| 2018/0158246 A1* | 6/2018 | Grau ..................... G06T 3/18 |

OTHER PUBLICATIONS

China Office Action and Search Report for the related Application No. 201980029370.9, dated Jun. 28, 2022, 34 pages.

* cited by examiner

PUPPETEERING A REMOTE AVATAR BY FACIAL EXPRESSIONS

CROSS REFERENCE TO RELATED APPLICATIONS

This U.S. patent application is a continuation of, and claims priority under 35 U.S.C. § 120 from, U.S. patent application Ser. No. 18/058,621, filed Nov. 23, 2022, which is a continuation of U.S. patent application Ser. No. 17/052, 161, filed on Oct. 30, 2020, now U.S. Pat. No. 11,538,211, which is a national stage application of, and claims priority under 35 U.S.C. § 371 from PCT/US2019/030218, filed on May 1, 2019, which claims priority under 35 U.S.C. § 119(e) to U.S. Provisional Application 62/667,767, filed on May 7, 2018. The disclosures of these prior applications are considered part of the disclosure of this application and are hereby incorporated by reference in their entireties.

TECHNICAL FIELD

This disclosure relates to puppeteering a remote avatar by facial expressions.

BACKGROUND

As technology has evolved, people have continued to employ technology as a form of communication. For example, technology allowed communication to expand from a simple physical conversation to a remote real-time conversation. Yet with this expansion, remote forms of communication generally lack some ability to capture expressions and emotions involved in a physical conversation. For example, it often proves difficult to decipher an emotional context from an email or a text conversation. To overcome these deficiencies, methods of communication have sought to provide ways to represent emotion and expression. For example, text applications now include a wide range of emojis and animations to express moods, opinions, or simply offer whimsical entertainment. As people increasingly communicate using real-time audio and video connections, there is an increasing demand for ways to reflect a user's personality and character within these communication channels.

SUMMARY

One aspect of the disclosure provides a method for puppeteering a remote avatar. The method includes receiving, at data processing hardware, a first facial framework and a first captured image of a face of a user with a neutral facial expression. The first facial framework corresponds to the face of the user at a first frame and includes a first facial mesh of facial information. The method also includes projecting, by the data processing hardware, the first captured image of the face onto the first facial framework and determining, by the data processing hardware, a facial texture corresponding to the face of the user based on the projected captured image. The method also includes receiving, at the data processing hardware, a second facial framework that corresponds to the face of the user at a second frame. The second facial framework includes a second facial mesh of facial information. The method also includes updating, by the data processing hardware, the facial texture based on the received second facial framework and displaying, by the data processing hardware, the updated facial texture as a three-dimensional avatar. The three-dimensional avatar corresponds to a virtual representation of the face of the user.

Implementations of the disclosure may include one or more of the following optional features. In some implementations, the method also includes: receiving, at the data processing hardware, a second captured image of the face of the user, the second captured image capturing a smile as a facial expression of the user; receiving, at the data processing hardware, a third captured image of the face of the user, the third captured image capturing, as the facial expression of the user, both eyebrows raised; receiving, at the data processing hardware, a fourth captured image of the face of the user, the fourth captured image capturing, as the facial expression of the user, a smile and both eyebrows raised; for each captured image, determining, by the data processing hardware, a facial expression texture corresponding to the face of the user; blending, by the data processing hardware, the facial expression textures of each captured image and the updated facial texture based on the received second facial framework to generate a blended facial texture; and rendering, by the data processing hardware, the three-dimensional avatar with the blended facial texture. In these implementations, blending further includes: determining a texture vector for each captured image, the texture vector corresponding to a vector representation of a difference from the first captured image with the neutral facial expression; determining a current texture vector based on the received second facial framework; assigning rendering weights based on a difference between the current texture vector and the texture vector of each captured image; and rendering the three-dimensional avatar with the blended facial texture based on the rendering weights. The rendering weights may have a sum equal to one. In some examples, each of the current texture vector and the texture vector of each captured image may correspond to a fifty-two variable float vector. In these examples, the rendering weights descend in magnitude as the difference between the current texture vector and the texture vector of each captured image increases.

In some examples, the method also includes receiving, at the data processing hardware, a captured current image of the face of the user with a current facial expression mesh of facial information at the second frame, and updating, by the data processing hardware, the facial texture based on the received facial framework and the captured current image. In some implementations, the received captured current image corresponds to a reduced amount of facial texture. In these implementations, the method may also include: determining, by the data processing hardware, an obstructed portion of the face of the user based on the received captured current image; and blending, by the data processing hardware, the obstructed portion of the face of the user with facial texture generated from an unobstructed captured image from a prior frame.

In some implementations, the method also includes generating, by the data processing hardware, a rendition of an ye or a mouth of the user by: detecting, by the data processing hardware, edges of the eye or the mouth; determining, by the data processing hardware, that a sum of angles associated with the edges of the eye or the mouth correspond to two pi (three hundred-sixty degrees); approximating, by the data processing hardware, a position of the eye or the mouth based on the detected edges that correspond to two pi; extracting, by the data processing hardware, the mouth or the eye at the approximated position from the captured image of the face; and rendering, by the data processing hardware, the extracted mouth or the extracted eye at the approximated position with a fill. The captured image may include a red-green-and blue (RGB) image from a mobile phone. The three-dimensional avatar may be displayed on an augmented reality (AR) device.

Another aspect of the disclosure provides a system for puppeteering a remote avatar. The system includes data processing hardware and memory hardware in communication with the data processing hardware, the memory hardware storing instructions that when executed on the data processing hardware cause the data processing hardware to perform operations that include receiving a first facial framework and a first captured image of a face of a user with a neutral facial expression. The first facial framework corresponds to the face of the user at a first frame and includes a first facial mesh of facial information. The operations also include projecting the first captured image of the face onto the first facial framework and determining a facial texture corresponding to the face of the user based on the projected captured image. The operations also include receiving a second facial framework that corresponds to the face of the user at a second frame. The second facial framework includes a second facial mesh of facial information. The operations also include updating the facial texture based on the received second facial framework and displaying the updated facial texture as a three-dimensional avatar. The three-dimensional avatar corresponds to a virtual representation of the face of the user.

This aspect may include one or more of the following optional features. In some implementations, the operations also include: receiving a second captured image of the face of the user, the second captured image capturing a smile as a facial expression of the user; receiving a third captured image of the face of the user, the third captured image capturing, as the facial expression of the user, both eyebrows raised; receiving a fourth captured image of the face of the user, the fourth captured image capturing, as the facial expression of the user, a smile and both eyebrows raised; for each captured image, determining a facial expression texture corresponding to the face of the user; blending the facial expression textures of each captured image and the updated facial texture based on the received second facial framework to generate a blended facial texture; and rendering the three-dimensional avatar with the blended facial texture. In these implementations, blending further includes: determining a texture vector for each captured image, the texture vector corresponding to a vector representation of a difference from the first captured image with the neutral facial expression; determining a current texture vector based on the received second facial framework; assigning rendering weights based on a difference between the current texture vector and the texture vector of each captured image; and rendering the three-dimensional avatar with the blended facial texture based on the rendering weights. The rendering weights may have a sum equal to one. In some examples, each of the current texture vector and the texture vector of each captured image may correspond to a fifty-two variable float vector. In these examples, the rendering weights descend in magnitude as the difference between the current texture vector and the texture vector of each captured image increases.

In some examples, the operations also include receiving a captured current image of the face of the user with a current facial expression mesh of facial information at the second frame, and updating the facial texture based on the received facial framework and the captured current image. In some implementations, the received captured current image corresponds to a reduced amount of facial texture. In these implementations, the operations may also include: determining an obstructed portion of the face of the user based on the received captured current image; and blending the obstructed portion of the face of the user with facial texture generated from an unobstructed captured image from a prior frame.

In some implementations, the operations also include generating a rendition of an ye or a mouth of the user by: detecting edges of the eye or the mouth; determining that a sum of angles associated with the edges of the eye or the mouth correspond to two pi (three hundred-sixty degrees); approximating a position of the eye or the mouth based on the detected edges that correspond to two pi; extracting the mouth or the eye at the approximated position from the captured image of the face; and rendering the extracted mouth or the extracted eye at the approximated position with a fill. The captured image may include a red-green-and blue (RGB) image from a mobile phone. The three-dimensional avatar may be displayed on an augmented reality (AR) device.

Another aspect of the disclosure provides a method for puppeteering a remote avatar that includes receiving, at data processing hardware, a first facial framework and a first captured image of a face of a user with a neutral facial expression. The first facial framework corresponds to the face of the user at a first frame and includes a first facial mesh of facial information. The method also includes projecting, by the data processing hardware, the first captured image of the face onto the first facial framework and determining, by the data processing hardware, a facial texture corresponding to the face of the user based on the projected first captured image. The method also includes displaying, by the data processing hardware, the determined facial texture as a three-dimensional avatar, the three-dimensional avatar corresponding to a virtual representation of the face of the user.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
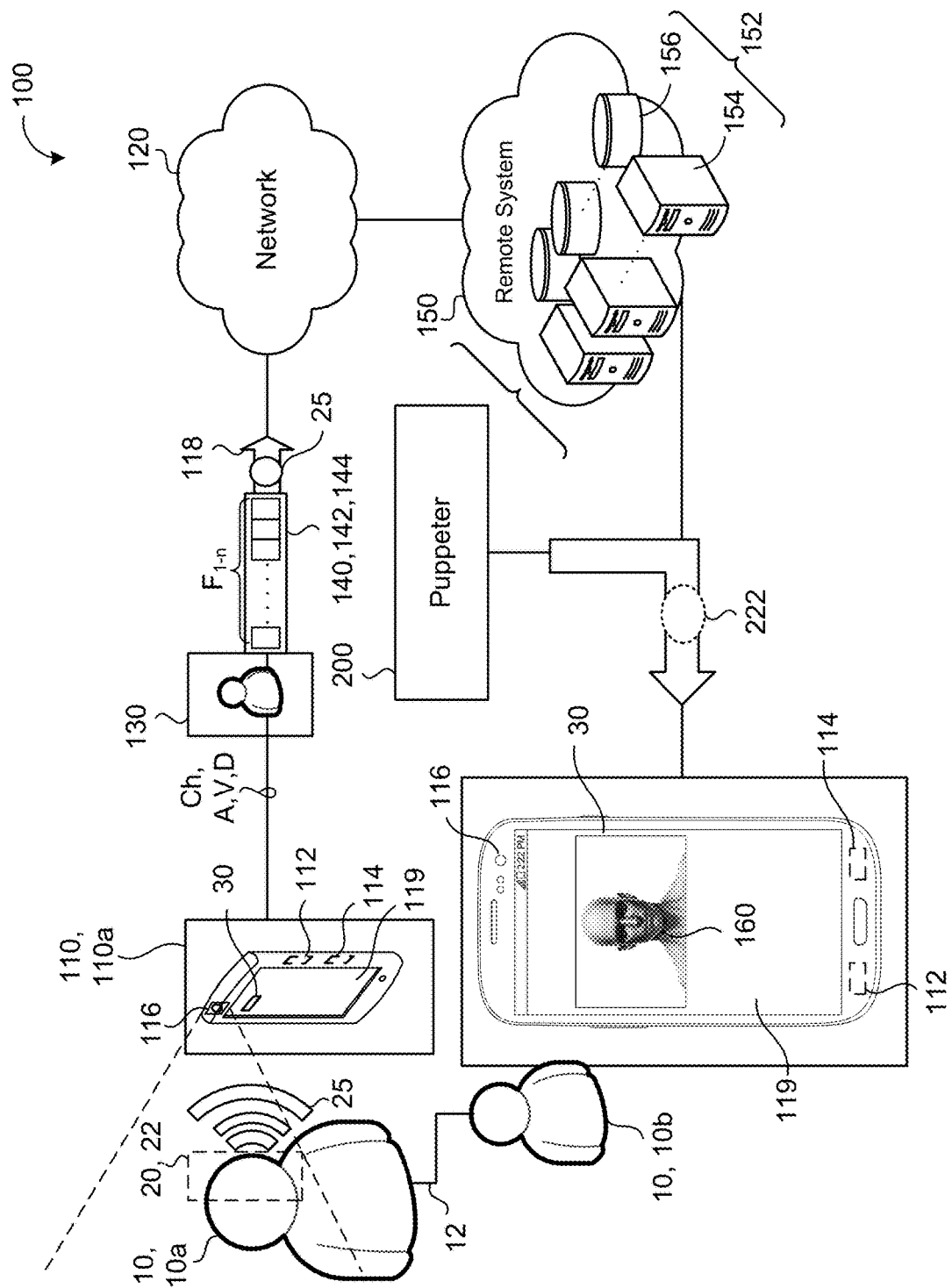
FIG. 1 is a schematic view of an example avatar puppeteering environment.

FIG. 1 is an example avatar puppeteering environment 100. The avatar puppeteering environment 100 is an environment where users 10, 10a-b have a conversation 12 via user devices 110, 110a-b across a network 120. The network 120 includes any type of communication network (e.g., a packet switched network) configured to route data between addresses associated with the user devices 110.

A conversation 12 generally refers to an audible sequence of speech between at least two users 10a, 10b. The user device 110 associated with each user 10 is configured to capture and communicate the conversation 12 over the network 120. The user devices 110 capture not only audio of the speech of the conversation 12, but also capture images 130 and facial information 140 of faces 20 of the users 10 as the users 10 speak during the conversation. Based on the captured images 130 and the facial information 140 of the faces 20, each user device 110 are further configured to generate facial expressions 22 for the associated user 10. Accordingly, the user devices 110 enable remote users 10 to be connected and engaged in a real-time conversation 12.

The user device 110 can be any computing devices or data processing hardware capable of: (1) communicating facial images 130 and facial information 140 to a network 120 and/or remote system 150; and (2) displaying a three-dimensional (3D) avatar 160 (e.g., with augmented reality (AR) capabilities). In some examples, a first user device 110a associated with a first user 10a is configured to communicate the facial image(s) 130 and facial information 140 associated with the first user 10a; while a second user device 110b associated with a second user 10b is configured to display the 3D avatar 160 associated with the first user 10a. In the example shown, each user device 110 includes data processing hardware 112, memory hardware 114, and one or more image capturing devices 116. Some examples of image capturing devices 116 are cameras (e.g., depth cameras or RGB cameras) or image sensors (e.g., laser imaging sensors). The user device 110, includes, but is not limited to, augmented reality (AR) devices, desktop computing devices, and mobile computing devices, such as laptops, tablets, smart phones, and wearable computing devices (e.g., headsets and/or watches). The user devices 110 are configured to utilize their image capturing devices 116 to allow the remote users 10 to engage in conversations 12 across the network 120.

With continued reference to FIG. 1, each user device 110 executes (i.e., via the data processing hardware 112) a real-time communication (RTC) application 30 to enable the first and second users 10a, 10b to have a conversation 12 with one another. As the first user 10a speaks to the second user 10b during the conversation 12, the first user device 110a captures audible speech (i.e., audio) 25, one or more facial images 130 of the face 20 of the first user 10a, and/or facial information 140 corresponding to the face 20 of the first user 10a. Thereafter, in some examples, the first user device 110a transmits an output 118 to the second user device 110b that includes the captured audible speech 25, the one or more facial images 130, and/or the facial information 140 via corresponding audio A and data D channels Ch, but not a video channel Ch, V. Here, the data channel Ch, D includes a lossy data channel configured to transmit the facial images 130 and/or the facial information 140, while the audio channel Ch, A is configured to communicate the audio 25. The audible speech 25 transmitted over the audio channel Ch, A includes a digital representation of the speech spoken by the first user 10a. In other examples, the first user device 110a transmits the output 118 to the second user device 110b that includes the audio 25, the one or more facial images 130, and/or the facial information 140 via a corresponding video channel Ch, V to ensure synchronization with the related audio 25 from the conversation 12. For example, synchronizing the facial images 130 and/or the facial information 140 with the audio 25 via the video channel Ch, V may be desirable for large data sets (e.g., from the facial images 130 and the facial information 140) during real-time conversations to avoid latency issues. Optionally, a configuration of the RTC application 30 dictates communication channels CH used by the user devices.

Based on the output 118 transmitted from the first user device 110a, the second user device 110b is configured to display the 3D avatar 160 corresponding to the face 20 and facial expressions of the first user 10a on a display 119 of the second user device 110b. In the example shown, the RTC application 30 executing on the second user device 110b facilitates communication with a puppeteer 200 that is configured to generate the avatar 160 of the first user 10a based on the output 118 and provide the generated avatar 160 to the second user device 110b for display on the display 119. The 3D avatar 160 generated by the puppeteer 200 corresponds to a virtual representation of the face 20 of the first user 20a. The puppeteer 200 generates the 3D avatar 160 as a real-time 3D avatar 160 based on the output 160 from the first user device 110a. In some implementations, the second user device 110b receives the output 118 including the captured audible speech 25, the one or more facial images 130, and/or the facial information 140 from the first user device 110a via the network 120 and provides the output 118 to the puppeteer 200. In other implementations, the first user device 110a transmits the output 118 directly to the puppeteer 200. In these implementations, the RTC application 30 executing on the first user device 110a may activate a corresponding 3D avatar feature to allow the first user device 110a to provide the output 118 directly to the puppeteer 200 for generating the 3D avatar 160 corresponding to the face 20 and facial expressions of the first user 10a.

In some implementations, the puppeteer 200 includes an application hosted by a remote system 150, such as a distributed system of a cloud environment, accessed via a user device 110. In other implementations, the puppeteer 200 includes an application downloaded to memory hardware 114 of the user device 110. The puppeteer 200 may be configured to communicate with the remote system 150 to access resources 152 (e.g., data processing hardware 154 or memory hardware 156) for generating the 3D avatar 160 from the facial images 130 and/or the facial information 140. Additionally or alternatively, the puppeteer 200 may store generated 3D avatars 300 locally on the memory hardware 114 of the user device 110 and/or on the memory hardware 156 of the remote system 150. For example, the puppeteer 200 and/or the user device 110 may later augment or further render a stored 3D avatar 160 based on later received facial images 130 and/or facial information 140. Optionally, the RTC application 30 executing on the user device 110 may execute the puppeteer 200 locally without requiring access to the resources 152 of the remote system 150.

Each facial image 130 refers to an image of the face 20 of a user 10 captured by the image capturing device(s) 116. The captured facial image 130 may vary in both resolution and embedded data depending on a type of image capturing device 116 that captures the facial image 130. For example, when a camera or a sensor with depth capability captures the facial image 130 of the user 10, the captured image 130 includes depth data identifying relationships between facial features and/or facial textures (e.g., shadows, lighting, skin texture, etc.). With depth data, a captured image 130 may inherently include facial information 140 to form a facial mesh 142. For example, some depth cameras or sensors are configured to generate a mesh from a captured image 130 using surface reconstruction algorithms. In other examples, the captured image 130 generated by cameras or sensors without depth capabilities (e.g., RBG cameras) requires further analysis with techniques such as facial landmark detection and/or facial feature detection to generate facial information 140.

Facial information 140 generally refers to a point cloud of data related to a face 20. With facial information 140, a surface reconstruction algorithm may generate a facial mesh 142 corresponding to the facial information 140. In some examples, a combination of the facial information 140 and the facial mesh 142 is referred to as a facial framework 144 as this combination corresponds to a facial structure with boundaries associated with the facial information 140. Although a facial framework 144 bears a resemblance to a user 10, a facial mesh 142 is generally a smooth rendering of the facial information 140. In other words, some unique characteristics of a face 20 of a user 10, such as wrinkles, dimples, smooth skin, dry skin, oily skin, porosity, etc., are lost with translation of the user 10 to a facial framework 144. To account for these missing aspects, the puppeteer 200 is configured to generate a facial texture 212 corresponding to these unique characteristics based on the facial framework 144 and at least one captured image 130.

Figure 2A:
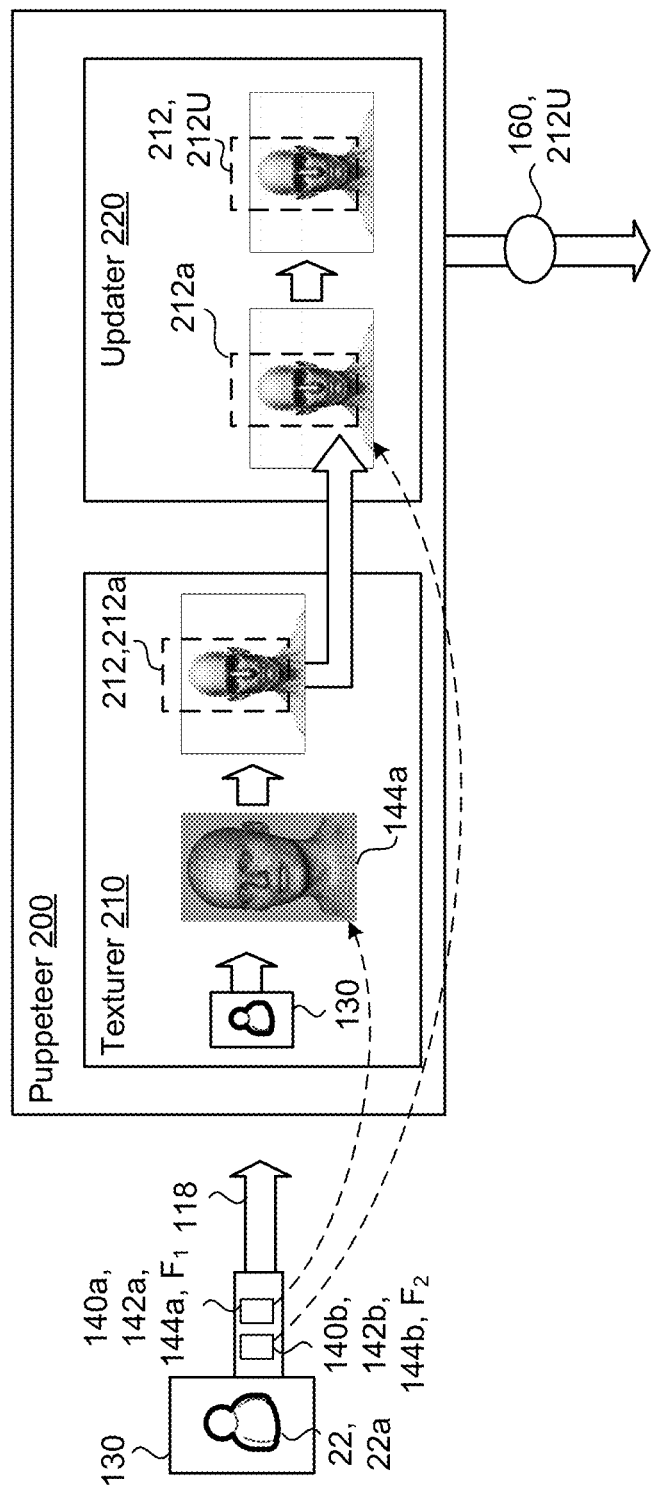
FIGS. 2A-2F are schematic views of example puppeteers for puppeteering an avatar in the avatar puppeteering environment of FIG. 1.

FIGS. 2A-2F are examples of the puppeteer 200 generating the 3D avatar 160 based on the received output 118 including the captured image(s) 130 and the facial information 140. The puppeteer 200 includes a texturer 210 and an updater 220. The texturer 210 is configured to determine a facial texture 212, while the updater 220 is configured to update the facial texture 212 based on subsequently received facial framework(s) 144 and/or captured image(s) 130. Referring to FIG. 2A, the puppeteer 200 receives the output 118 corresponding to a first captured image 130 of the face 20 of the user 10 and a first facial framework 144a that includes a first facial mesh 142 of facial information 140 of the user 10. The first facial framework 144a corresponds to the face 20 of the user 10 at a first frame F1. The captured image 130 may capture a facial expression 22 of the user 10. For instance, the captured image 130 may include a neutral facial expression 22a of the user 10. In the example shown, the texturer 210 projects the first captured image 130 of the face 20 onto the first facial framework 144a to determine a facial texture 212, 212a corresponding to the neutral facial expression 22, 22a of the face 20. After the texturer 210 determines the facial texture 212 (e.g., the first facial texture 212a), the updater 220 may then update the facial texture 212 based on a subsequent frame F2 from the conversation 12 that occurs subsequent in time to the first frame F1 to form an updated facial texture 212, 212U. Based on this updated facial texture 212U, the puppeteer 200 updates the displayed 3D avatar 160 as a user 10 proceeds to talk and change facial expressions 22 in real-time.

Implementations include the puppeteer 200 operating with minimal bandwidth requirements. Being conscientious of bandwidth, the facial texture 212 determined by the texturer 210 includes a static texture that updates based solely on facial information 140, such as facial framework(s) 144. In other words, rather relying on large captured image files at the puppeteer 200, the puppeteer 200 generates the 3D avatar 160 by updating the facial texture 212 based on facial information of later frames F in the conversation 12 (e.g., the second frame F2). This static approach permits updates to the facial mesh 142 and the facial structure 144 in real-time without incurring increased bandwidth requirements of the avatar puppeteering environment 100. For example, FIG. 2A shows the updater 220 of the puppeteer 200 receiving the facial texture 212a in combination with a second facial framework 144b corresponding to the face 20 of the user 10 at a second frame F2. Here, much like the first frame F1, the second facial framework 144b includes a second facial mesh 142b of the facial information 140 at the second frame F2. In this configuration, the updater 220 updates the facial texture 212, 212a based on the received second facial framework 144b to form the updated facial texture 212U. Thereafter, the puppeteer 200 uses the updated facial texture 212U to generate the 3D avatar 160 (or update an existing 3D avatar 160) and provides the generated 3D avatar 160 to the user device 110 for display on the display 119. In some examples, the puppeteer 200 provides the updated facial texture 212U to the user device 110 and the user device 110 (e.g., via the RTC application 30) generates the 3D avatar 160 or updates an existing 3D avatar 160.

Figure 2B:
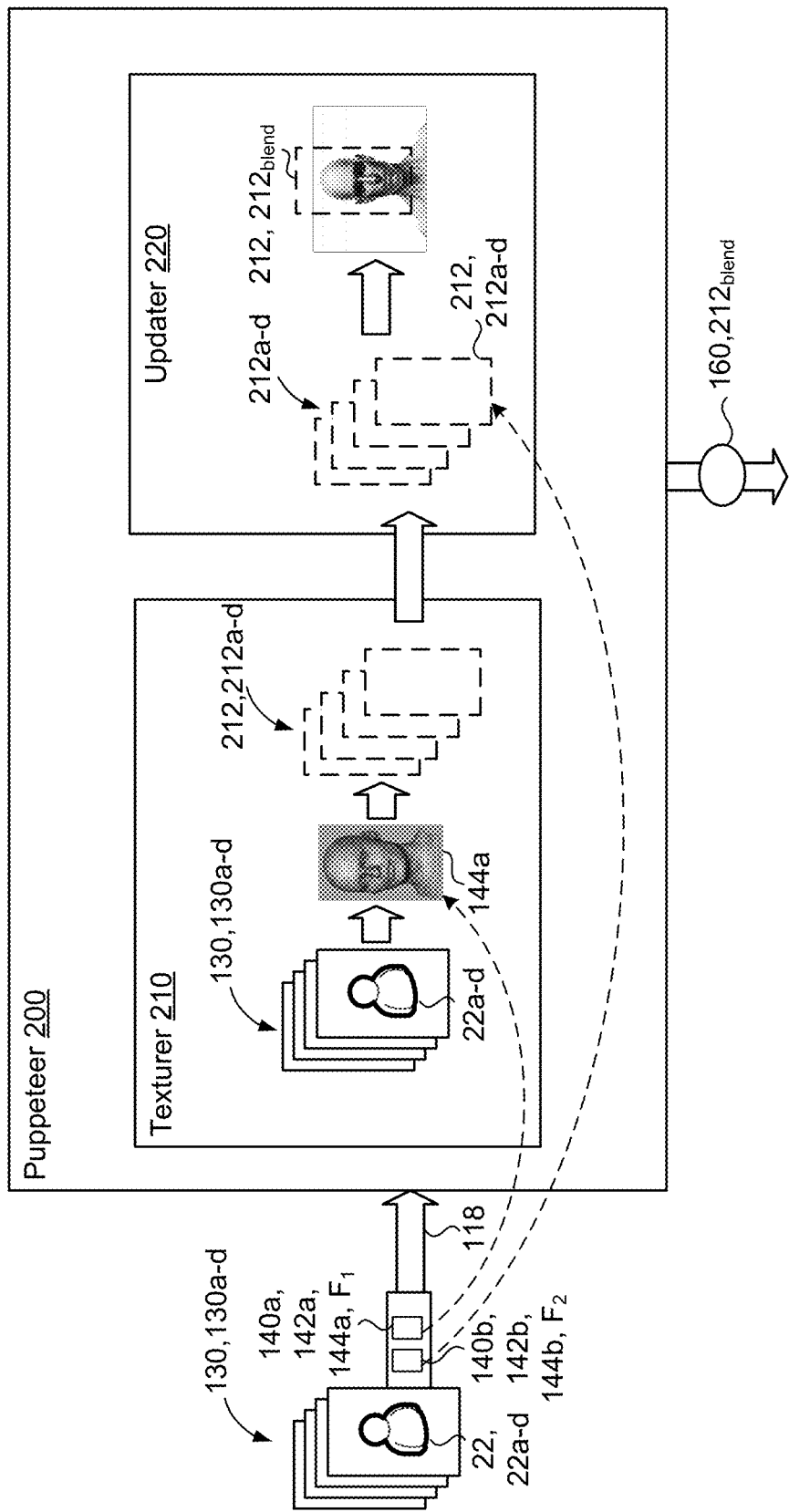

Referring to FIG. 2B, in some implementations, the puppeteer 200 receives a plurality of captured images 130, 130a-d of the face 20 of the user 20 and determines, for each captured image 130, a corresponding facial texture 212, 212a-d by projecting the captured image 130 of the face 20 onto the first facial framework 140a. Thereafter, the puppeteer 200 updates and blends each facial texture 212a-d based on the second facial framework 140b to generate a blended facial texture $212_{blend}$. While FIG. 2B depicts using four captured images 130a-d to generate the blended facial texture $212_{blend}$, any number of captured images 130 may be used without departing from the scope of the present disclosure. As such, by incorporating more than one captured image 130 into the facial texture generation, the puppeteer 200 may account for other baseline facial expressions 22, 22a-d in addition to, or in lieu of, the single neutral facial expression 22a of FIG. 2A.

In the example shown, the puppeteer 200 receives the output 118 corresponding to four captured images 130, 130a-d of the face 20 of the user 10 and the first facial framework 144a that includes the first facial mesh 142 of the facial information 140 of the user 10 at the first frame F1. The first facial framework 144a corresponds to the face 20 of the user 10 at a first frame F1. Here, each captured image 130a-d corresponds to a different facial expression 22, 22a-d of the user facial expression 22 of the user 10. For instance, the first captured image 130a corresponds to the neutral facial expression 22a, the second captured image 130b corresponds to a smiling facial expression 22b, the third captured image 130c corresponds to a both eyebrows raised facial expression 22c, and the fourth captured image 130d corresponds to a smiling with both eyebrows raised facial expression 22d. Accordingly, the texturer 210 is configured to determine a corresponding facial texture 212, 212a-d for each captured image 130 by projecting the captured image 130 onto the first facial framework 144a.

With continued reference to FIG. 2B, the updater 220 receives the facial textures 212a-d from the texturer 210. In some examples, the updater 220 updates each facial texture 212a-d based on the received second facial framework 144b and blends the corresponding updated facial textures 212U together to generate the blended facial texture $212_{blend}$ at the second frame F2. Thereafter, the puppeteer 200 uses the blended facial texture $212_{blend}$ to generate the 3D avatar 160 (or update an existing 3D avatar 160) and provides the generated 3D avatar 160 to the user device 110 for display on the display 119. In some examples, the puppeteer 200 provides the blended facial texture $212_{blend}$ to the user device 110 and the user device 110 (e.g., via the RTC application 30) generates the 3D avatar 160 or updates an existing 3D avatar 160.

Figure 2C:
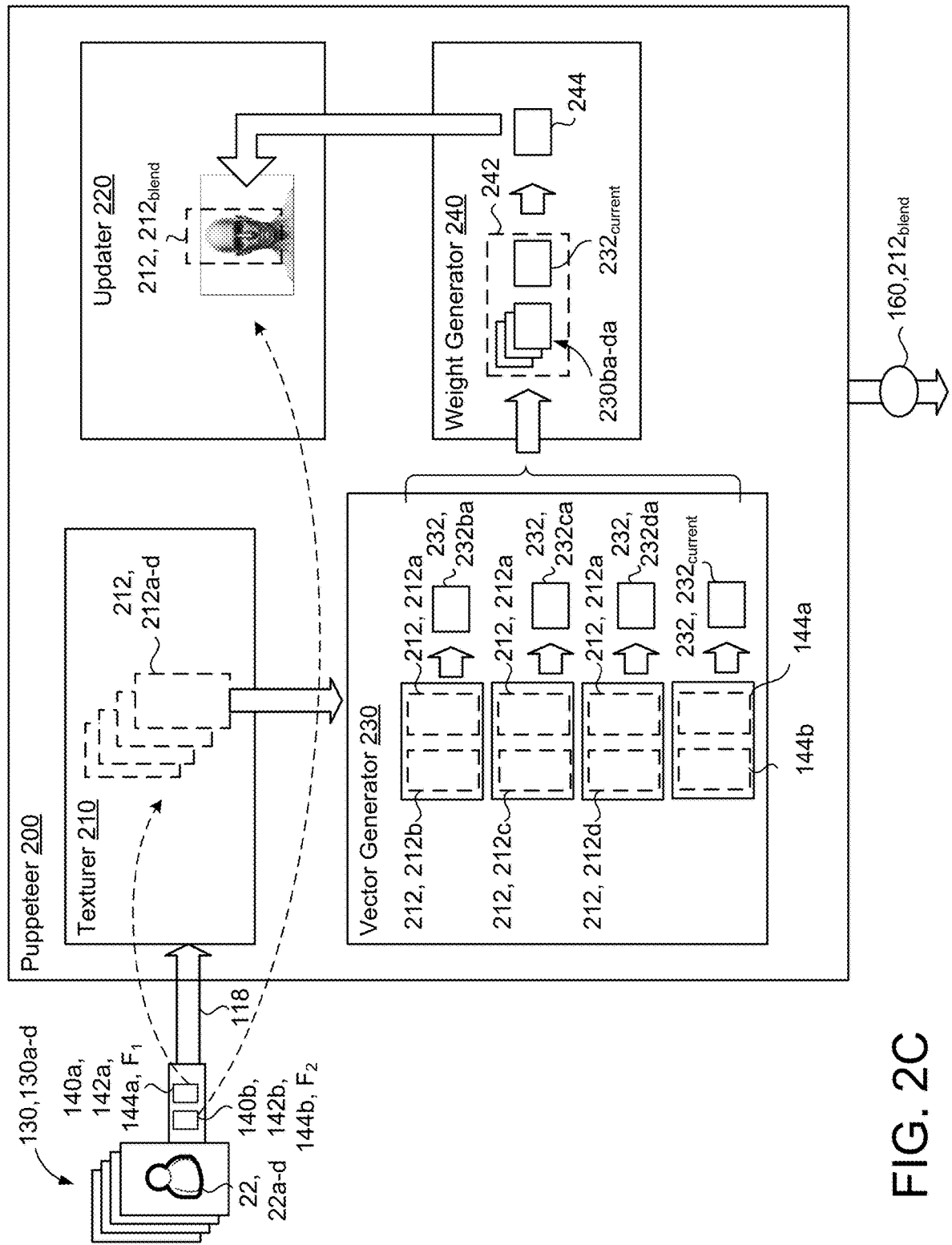

Referring to FIG. 2C, in some examples, the puppeteer 200 further includes vector and weight generators 230, 240 that cooperate to provide the updater 220 with rendering weights 244 for updating and blending the four facial textures 212a-d output from the texturer 210 to generate the blended facial texture 212$_{blend}$ at a current frame F (e.g., the second frame F2 in FIG. 2C). In the example shown, the vector generator 230 receives each facial texture 212a-d output from the texturer 210 and generates corresponding texture vectors 232 relative to a baseline facial texture 212. For instance, the baseline facial texture 212 may correspond to the first facial texture 212a associated with the first captured image 130a corresponding to the natural facial expression 22a. As such, the vector generator 230 may generate a first texture vector 232ba based on the second facial texture 212b relative to the first facial texture 212a, a second texture vector 232ca based on the third facial texture 212c relative to the first facial texture 212a, and a third texture vector 232da based on the fourth facial texture 212d relative to the first facial texture 212a. Further, the vector generator 230 generates a current texture vector 232, 232current corresponding to the facial information 140 at a recent frame F (e.g., the second frame F2). For instance, the vector generator 230 generates the current texture vector 232current between the first facial framework 144a at the first frame F1 and the second facial framework 144b at the second frame F2.

The weight generator 240 receives the current texture vector 232$_{current}$ and each of the texture vectors 232ba-da from the vector generator 230 and generates rendering weights 244 based on a respective difference 242 between the current texture vector 232$_{current}$ and each texture vector 232ba-da. In other words, the rendering weights 244 account for deviations at a current frame relative to the facial textures 212, 212a-d. Rendering weights 244 may be configured to correspond to known detected facial expressions. For example, the rendering weights 244 may include vectors associated with locations of facial landmarks such that each vector represents a magnitude and a direction from a baseline position of a facial landmark (e.g., from the first facial framework 144a of a neutral facial expression 22, 22a to a second facial framework 144b of a facial expression 22 at the second frame F2). In one example, the rendering weights 244 form a fifty-two variable float vector. In some examples, the rendering weights 244 correspond to blending percentages such that values of the rendering weights 244 include respective ratios with a sum equal to one.

In some implementations, the weight generator 240 assigns a highest value to a value within the rendering weights 244 when a texture vector 232 is closest to the current texture vector 232$_{current}$. For example, when the second facial framework 144b indicates that a current facial expression 22 of the user 10 approaches a smile (e.g., the second facial expression 22b associated with the second texture vector 232ba), the respective difference between the current texture vector 232$_{current}$ and the second texture vector 232ba associated with the smiling facial expression 22b is less than the differences between the current texture vector 232$_{current}$ and the other texture vectors 232ca, 232da. In this instance, the weight generator 240 assigns values to the rendering weights 244 bias toward the smiling facial expression 22b (e.g., a higher rendering weight value). Accordingly, updater 220 uses these rendering weights 244 assigned by the weight generator 240 generate the blended facial texture 222$_{blend}$ more towards the second facial texture 212b associated with the smiling facial expression 22b.

Unlike the puppeteer 200 of FIG. 2A operating with minimal bandwidth requirements, the puppeteers 200 of FIGS. 2B and 2C require greater bandwidth by accounting for more captured images 130a-d of the face 20 of the user 10 to achieve a more accurate visual representation of the face 20 of the user 10. Here, a puppeteer 200 with a finite number of captured images 130 (e.g., four captured images 130a-d) may increase accuracy while still minimizing bandwidth by updating the 3D avatar 160 based on facial information 140 (e.g., a second facial framework 144b) at a current frame (e.g., the second frame F2) rather than updating the facial texture 212 from a current captured image 130, 130$_{current}$ (as shown in FIG. 2D).

Figure 2D:
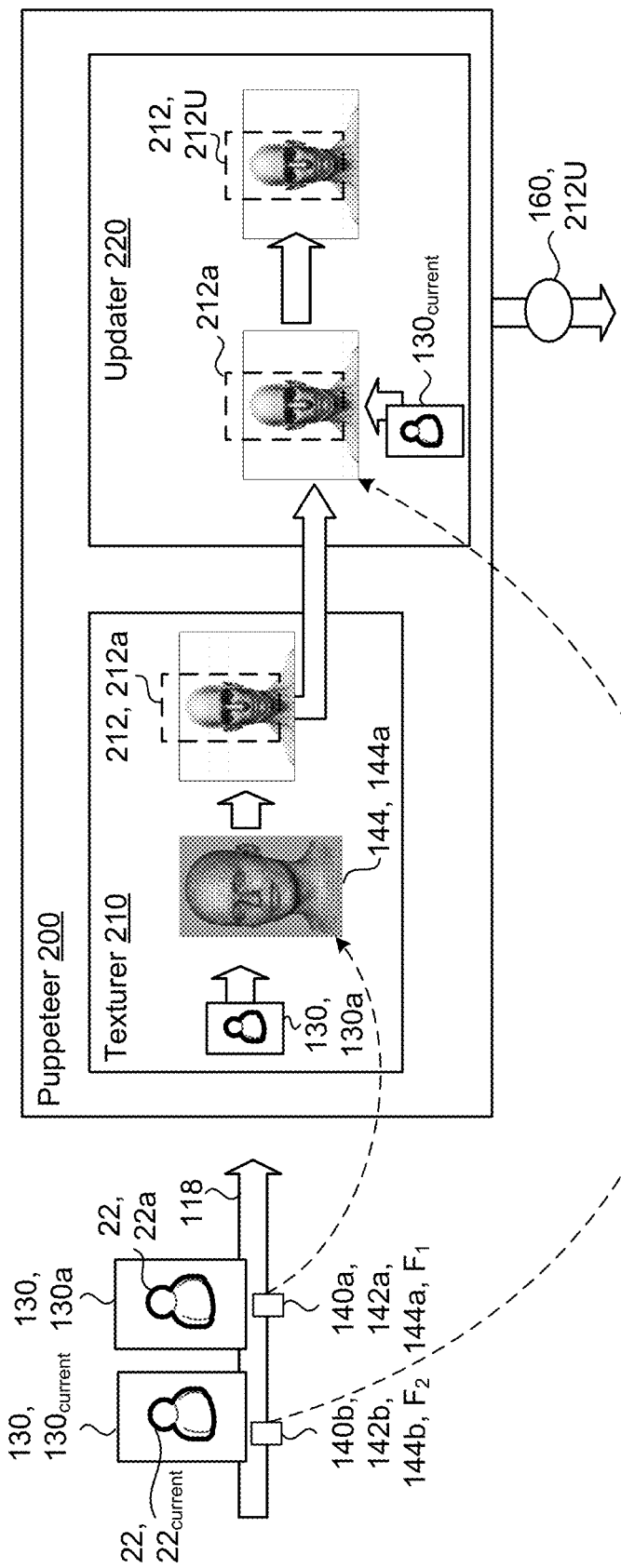

FIG. 2D is an examples of a puppeteer 200 that receives the current captured image 130, 130$_{current}$ at the second frame F2. In this configuration, the puppeteer 200 operates similar to the puppeteer 200 of FIG. 2A except that the updater 220 updates the first facial texture 212a based on both the second facial framework 144b and the current captured image 130$_{current}$. In some implementations, when utilizing the current captured image 130$_{current}$ of the user 10, the puppeteer 200 receives and/or reduces an amount of facial texture 212 associated with the current captured image 130$_{current}$. For example, the updater 220 generates the updated facial texture 212U based on the current captured image 130$_{current}$ having one third of the facial texture 212 (e.g., when compared to the first facial texture 212a). By reducing an amount of facial texture 212 within the current captured image 130$_{current}$, the puppeteer 200 may reduce its operating bandwidth requirements.

Figure 2E:
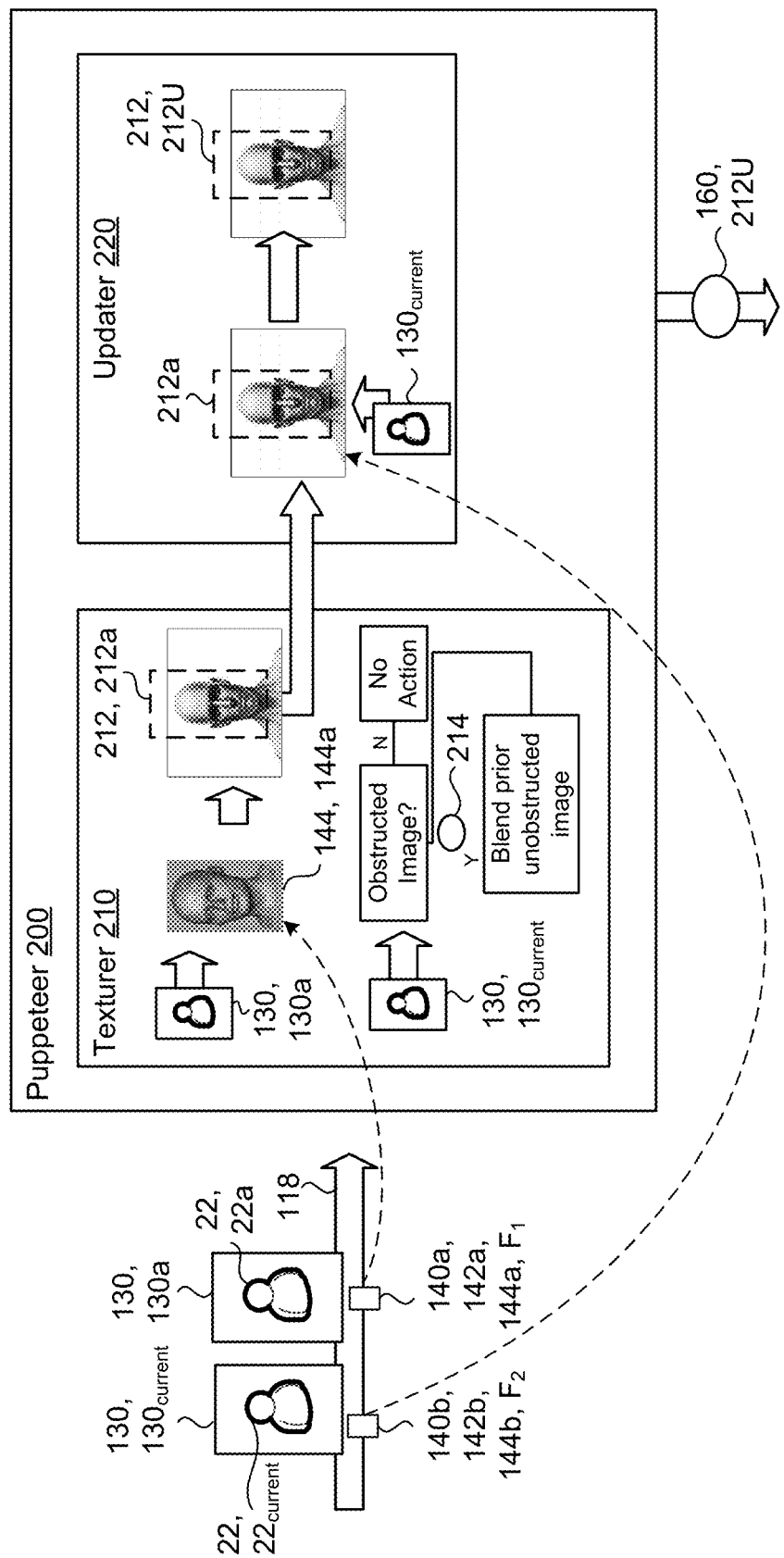

Referring to FIG. 2E, in some examples, facial information 140 and/or facial framework(s) 144 correspond to a partial capture (e.g, an obstructed image 214) of the face 20 of the user 10. For example, the user 10 moves within a field of view or moves the image capturing device 116. In these examples, the puppeteer 200 may be additionally configured to account for these issues. In some configurations, the texturer 210 identifies whether the current capture image 130$_{current}$ and or second facial framework 144b corresponds to an obstructed image. For example, the texturer 210 tracks and analyzes how much facial information 140 is received on average and compares this data to the current capture image 130$_{current}$ and/or the second facial framework 144b. When the texturer 210 identifies an obstructed image and/or obstructed facial information, the texturer 210 identifies a preceding frame $F_{n-1}$ that is not obstructed to generate the facial texture 212 for the obstructed portion of the obstructed capture 214. For example, when the texturer 210 determines the second frame $F_2$ includes an obstructed image 214 and the first frame F1 includes an unobstructed image (e.g., the first captured image 130a), the texturer 210 may render the obstructed capture 214 (e.g., the received current captured image 130$_{current}$) with the facial information 140 associated with the first frame $F_1$.

Figure 2F:
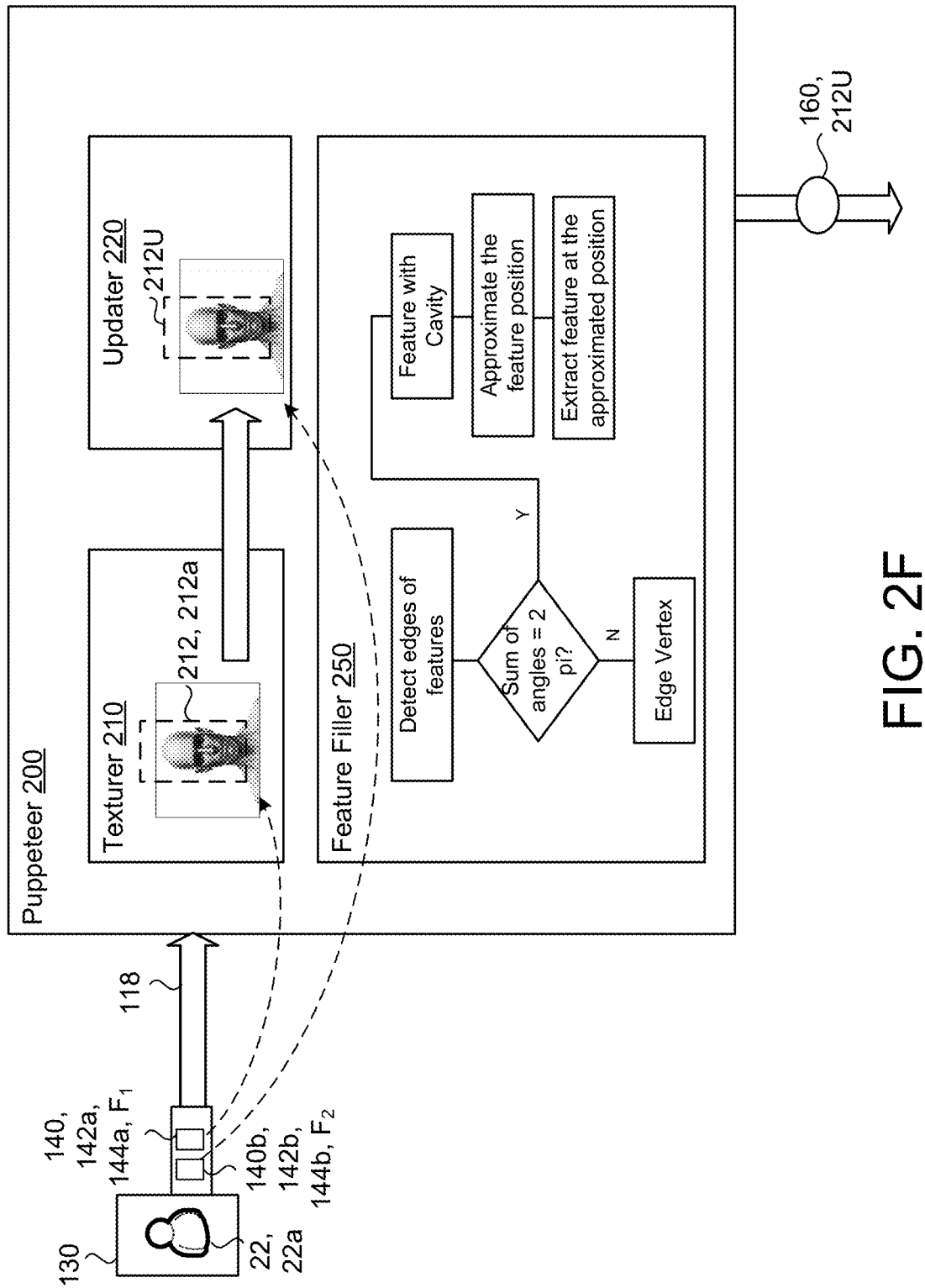

Referring to FIG. 2F, in some implementations, the puppeteer 200 includes a feature filler 250. The feature filler 250 identifies often troublesome features like eyes or mouths and fills in (i.e. visually represents) cavities associated with these features. FIG. 2F shows a simplified puppeteer 200 to focus on the feature filler 250. In some examples, the feature filler 250 detects edges of features. For example, the feature filler 250 sums all angles that center around a vertex. When the sum equals two pi or three hundred and sixty degrees, the feature filler 250 determines that the feature is a cavity, such as an eye or mouth. When the sum does not equal two pi, the feature filler 250 identifies the feature as an edge vertex. Once the feature is identified as a cavity, the feature filler 250 approximates a position of the cavity based on facial proportions and/or locations of the detected edges. Here, at the approximated position, the feature filler 250 extracts the feature and renders the extracted feature with a fill. In some examples, a two-ear approach is used to fill the feature while the facial texture 212 maps vertices used during edge detection for the feature filler 250.

Figure 3:
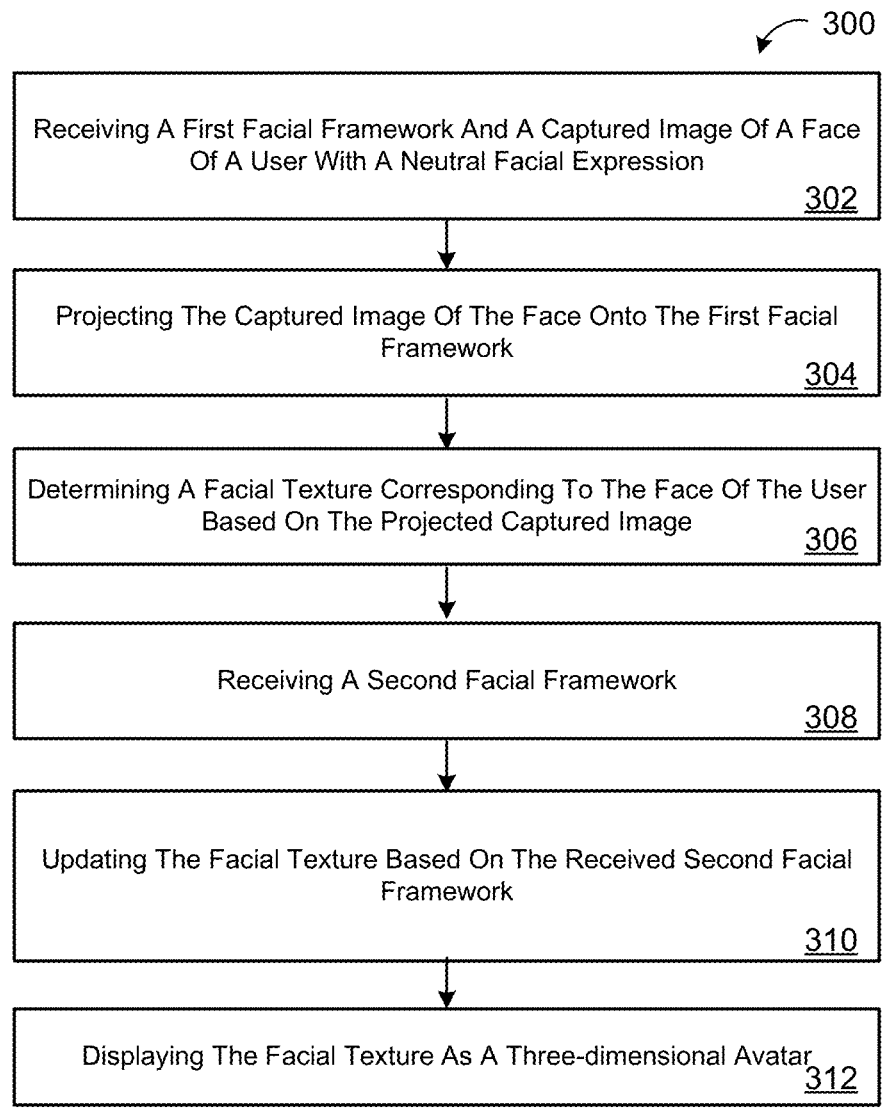
FIG. 3 is a flowchart of an example arrangement of operations for a method of puppeteering a remote avatar by facial expressions.

FIG. 3 is a flowchart for an example arrangement of operations for a method 300 of puppeteering a remote avatar 160. At operation 302, the method 300 receives a first facial framework 144, 144a and a first captured image 130 of a face 20 of the user 10 with a neutral facial expression 22, 22a. The first facial framework 144a corresponds to the face 20 of the user 10 at a first frame F1 and includes a first facial mesh 142, 142a of facial information 140. At operation 304, the method 300 projects the first captured image 130 of the face 20 onto the first facial framework 144a. At operation 306, the method 300 determines a facial texture 212 corresponding to the face 20 of the user 10 based on the projected captured image 130. At operation 308, the method 300 receives a second facial framework 144b corresponding to the face 20 of the user 10 at a second frame F2. The second facial framework 144b includes a second facial mesh 142, 142b of the facial information 140. At operation 310, the method 300 updates the facial texture 212 based on the received second facial framework 144b. At operation 312, the method 300 displays the updated facial texture 212 as a 3D avatar 160. The 3D avatar 160 corresponds to a virtual representation of the face 20 of the user 10.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 4:
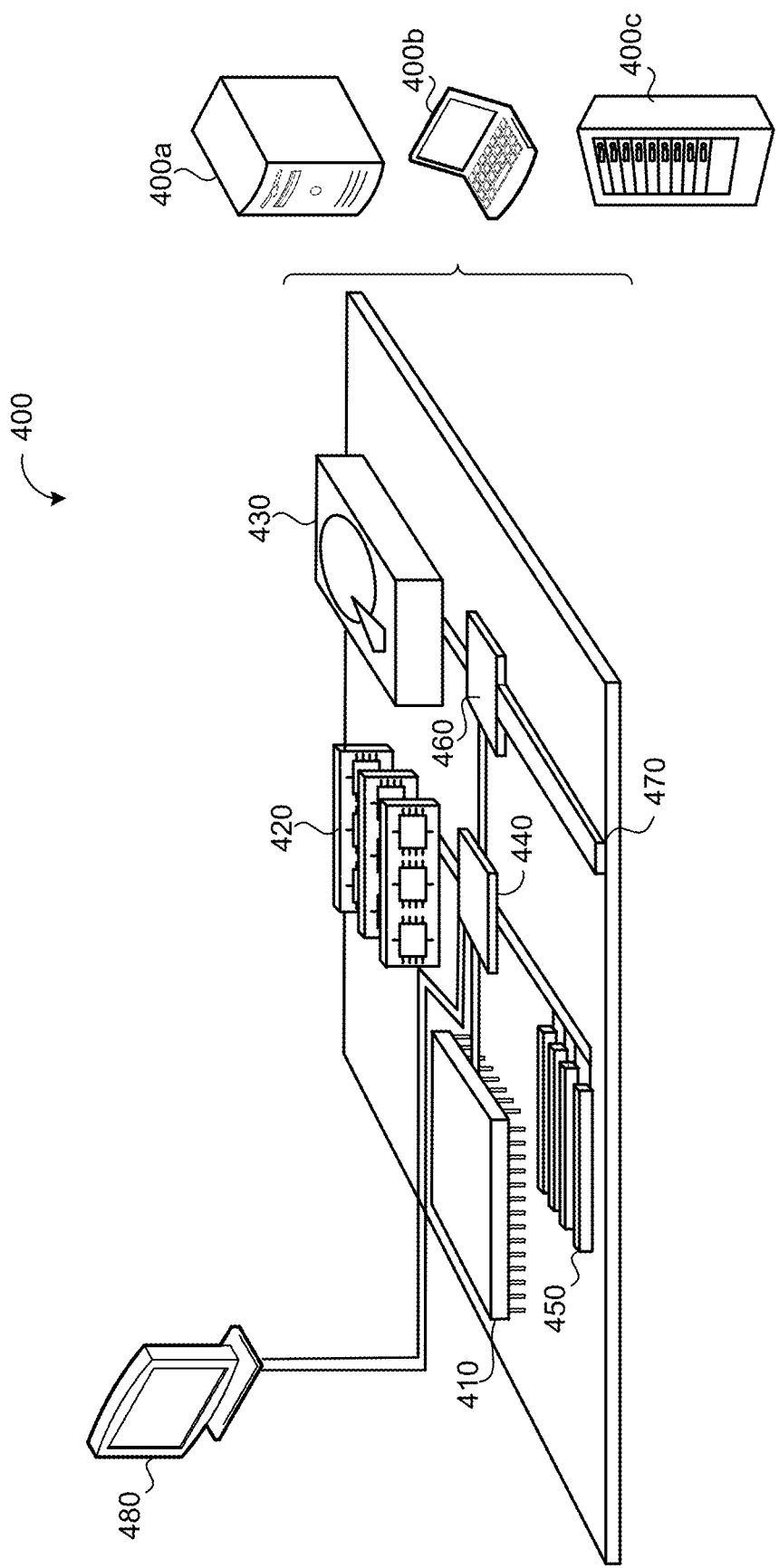
FIG. 4 is a schematic view of an example computing device that may be used to implement the systems and methods described herein.

FIG. 4 is schematic view of an example computing device 400 that may be used to implement the systems and methods of, for example, the user device 110, the remote system 150, and the puppeteer 200, described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving a first facial framework and a first captured image of a face of a user with a neutral facial expression, the first facial framework corresponding to the face of the user at a first frame;
   determining a first facial texture based on the first facial framework and the first captured image, the first facial texture corresponding to the neutral facial expression;
   receiving a second facial framework and a second captured image of the face of the user with a non-neutral facial expression, the second facial framework corresponding to the face of the user at a second frame;
   determining a second facial texture based on the second facial framework, the second facial texture corresponding to the non-neutral facial expression;
   blending the neutral facial expression corresponding to the first facial texture and the non-neutral facial expression corresponding to the second facial texture together to generate a third facial texture; and
   displaying the third facial texture as a three-dimensional avatar, the three-dimensional avatar corresponding to a virtual representation of the face of the user.

2. The computer-implemented method of claim 1, wherein the operations further comprise:
   receiving audio data associated with the first captured image; and
   generating the audio data synchronously with displaying the third facial texture as the three-dimensional avatar.

3. The computer-implemented method of claim 1, wherein receiving the first captured image comprises receiving the first captured image from a first user device associated with the user.

4. The computer-implemented method of claim 3, wherein displaying the third facial texture as the three-dimensional avatar comprises displaying the third facial texture as the three-dimensional avatar at a second user device associated with another user.

5. The computer-implemented method of claim 1, wherein the non-neutral facial expression comprises a smiling facial expression.

6. The computer-implemented method of claim 1, wherein the non-neutral facial expression comprises both eyebrows raised.

7. The computer-implemented method of claim 1, wherein the first captured image comprises a red-green-and blue image from a first user device.

8. The computer-implemented method of claim 1, wherein the three-dimensional avatar is displayed on an augmented reality device.

9. The computer-implemented method of claim 1, wherein the first facial framework comprises an obstructed view of the face of the user.

10. The computer-implemented method of claim 1, wherein the operations further comprise rendering a facial cavity onto the first facial framework.

11. A system comprising:
data processing hardware; and
memory hardware in communication with the data processing hardware, the memory hardware storing instructions that when executed on the data processing hardware cause the data processing hardware to perform operations comprising:
  receiving a first facial framework and a first captured image of a face of a user with a neutral facial expression, the first facial framework corresponding to the face of the user at a first frame;
  determining a first facial texture based on the first facial framework and the first captured image, the first facial texture corresponding to the neutral facial expression;
  receiving a second facial framework and a second captured image of the face of the user with a non-neutral facial expression, the second facial framework corresponding to the face of the user at a second frame;
  determining a second facial texture based on the second facial framework, the second facial texture corresponding to the non-neutral facial expression;
  blending the neutral facial expression corresponding to the first facial texture and the non-neutral facial expression corresponding to the second facial texture together to generate a third facial texture; and
  displaying the third facial texture as a three-dimensional avatar, the three-dimensional avatar corresponding to a virtual representation of the face of the user.

12. The system of claim 11, wherein the operations further comprise:
receiving audio data associated with the first captured image; and
generating the audio data synchronously with displaying the third facial texture as the three-dimensional avatar.

13. The system of claim 11, wherein receiving the first captured image comprises receiving the first captured image from a first user device associated with the user.

14. The system of claim 13, wherein displaying the third facial texture as the three-dimensional avatar comprises displaying the third facial texture as the three-dimensional avatar at a second user device associated with another user.

15. The system of claim 11, wherein the non-neutral facial expression comprises a smiling facial expression.

16. The system of claim 11, wherein the non-neutral facial expression comprises both eyebrows raised.

17. The system of claim 11, wherein the first captured image comprises a red-green-and blue image from a first user device.

18. The system of claim 11, wherein the three-dimensional avatar is displayed on an augmented reality device.

19. The system of claim 11, wherein the first facial framework comprises an obstructed view of the face of the user.

20. The system of claim 11, wherein the operations further comprise rendering a facial cavity onto the first facial framework.

* * * * *